Aug. 24, 1948.                F. RIEBER                 2,447,817
                 TEMPERATURE OR PRESSURE RESPONSIVE
                      VARIABLE FREQUENCY OSCILLATOR
                         Filed Jan. 29, 1944
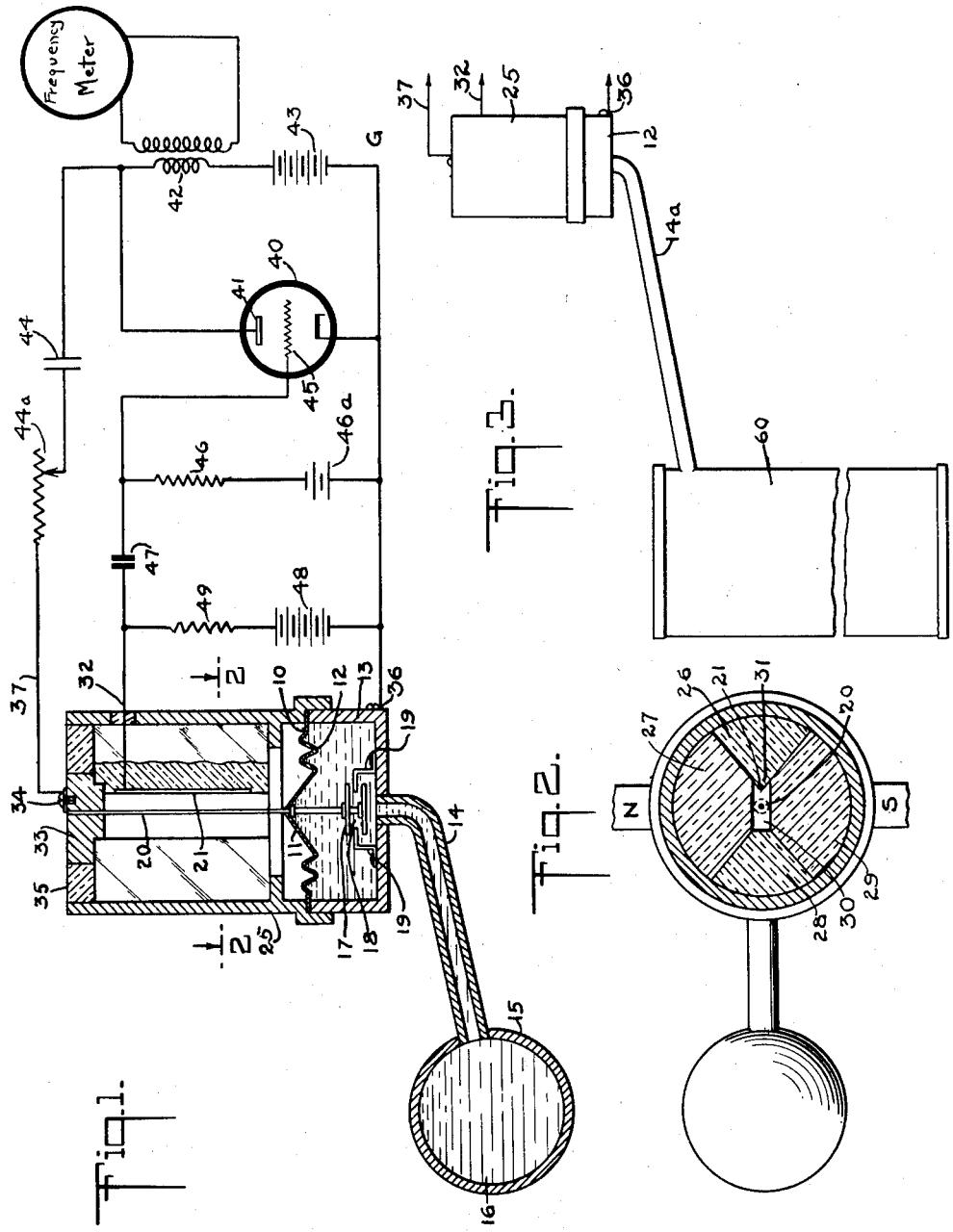
INVENTOR.
FRANK RIEBER
BY
ATTORNEY Patented Aug. 24, 1948

2,447,817

UNITED STATES PATENT OFFICE 2,447,817

TEMPERATURE OR PRESSURE RESPONSIVE VARIABLE FREQUENCY OSCILLATOR

Frank Rieber, New York, N. Y., assignor to Interval Instruments, Inc., New York, N. Y., a corporation of New York Application January 29, 1944, Serial No. 520,199

10 Claims. (Cl. 250—36)

This invention relates to telegauges for measuring pressures and converting the pressure values into electrical values that can, if desired, be transmitted to a distant point. Such an instrument may also be connected to a confined bulb of liquid, and it will then respond to the expansion of the liquid to provide a telethermometer.

It is an object of this invention to provide an instrument of the character described which will respond to pressures exerted upon a pressure responsive device, such as a diaphragm, and convert those pressures into changes in the frequency of a pulsating current, so that even at a distant station, the original pressure may be read or recorded or employed by any instrument capable of translating that frequency back into terms of the pressure to which it corresponds, with great accuracy and fidelity.

It has heretofore been proposed to place a magnetic wire of iron or nickel in the field of an electromagnet so that it may be set in vibration by an alternating current passing through a coil on the magnet, and then electromagnetically, or by a make and break contact, to derive an alternating current from the vibration of the wire to maintain the wire in oscillation. And it has been proposed to transmit the current to a distant station to act upon a similar wire, the tension of which can be varied until it vibrates in harmony with the first, so that the frequency of the first wire may be determined at the distant station by the constants of the second.

Such systems, however, have many limitations which render them unreliable and militate against the accuracy of the results. Where an electromagnetic pickup is used, the pickup interferes with the field actuating magnet, and in turn is reacted upon by it so the preciseness of the frequency which the wire will sustain cannot be relied upon. Where a make and break contact is used as the pickup, the results are also unsatisfactory. The contacts give trouble, and the actuating current being composed of spaced short impulses, and the magnets being localized to act upon the wire at one definite point only where the magnet is situated, emphasize the harmonic frequencies at the expense of the fundamental. Moreover, as the wire approaches the magnet pole, the intensity of the magnetic field becomes very much stronger, thus introducing a variable factor which makes the ultimate frequency depend in part upon the amplitude of the vibration.

To secure accuracy of response of such a wire, it is essential that the wire vibrate at one frequency only, whether it be the fundamental or a single harmonic, since other vibrations alter the frequency by imposing increased tension on the wire. We have here selected for illustration the vibration of the wire at its fundamental frequency, and for this purpose it is important that the motor force act upon a considerable portion of the wire, at least, preferably more than a third, to prevent stimulation of the third and higher harmonics, and this motor force should be symmetrically disposed to prevent the introduction of undesired harmonics. If a higher harmonic be selected, the same principles will obtain if we consider the unit portion of the wire between nodes as the wire.

It is also important that the motor force acting upon the wire shall be substantially uniform and shall be exerted at the same point in the movement of the wire at each successive impulse, since otherwise variations in amplitude will occur with resultant changes in frequency because the greater the amplitude, the more tension on the wire and hence the higher frequency.

A further important factor is that the take-off, that is, the mechanism by which the vibration reacts on the oscillator system to determine its frequency, shall be such as to respond only to the chosen harmonic, which in general means that it shall respond to the vibration of the desired unit of the wire as a whole, and in so far as possible cancel out vibrations at multiple or fractional frequencies. That is if the fundamental be the chosen frequency, the take-off should be such as to cancel out response to multiple frequencies. This can be accomplished by making the take-off extend symmetrically through substantially the entire vibration portion length of the wire so that vibrating fractions will in so far as possible neutralize each other in their effect on the oscillating system.

It is also important that the motor force shall be symmetrical transverse to the direction of motion, since a motor force which acts non-uniformly encourages undesired harmonics.

In accordance with this invention, I employ a wire vibrating in an electric field to determine the frequency of a generated current and vary the tension upon the wire by the pressure upon the pressure responsive instrument exactly correspondent to the pressures, or temperature values, but I maintain the wire in a constant magnetic field and I utilize it in such a way that the frequency cannot be interfered with by the take-off system and without introducing any make and break contacts or other like apparatus which can easily get out of order or cause trouble, and in such a manner that the results are independent of variations of voltage of amplitude of vibration.

I accomplish the foregoing results by making the wire vibrate transverse to the magnetic field in response to a pulsating current passing through the wire itself, and I employ an electrostatic pickup to determine the frequency of the pulsating current.

In my copending application for transducers, filed of even date herewith and bearing Serial No. 520,196, I disclosed a transducer operating on the principle I have described either to generate a current in exact synchronism with an incoming signal, or to read an incoming alternating signal in terms of its own frequency or in terms of any quantity which bears a known relation to that frequency. In my copending application for oscillators, filed of even date herewith and bearing Serial No. 520,197, which has become abandoned, I have shown a similar instrument connected to an oscillator circuit to generate a current, the frequency of which is exactly determined by the wire.

The invention accordingly comprises a device possessing the features, properties and the relation of elements which will be exemplified in the article hereinafter described and the scope of the application of which will be indicated in the claims.

For a fuller understanding of the nature and objects of the invention, reference should be had to the following detailed description, taken in connection with the accompanying drawings, in which:

Fig. 1 is a central vertical section through the measuring apparatus when used as a telethermometer, coupled in a wiring circuit which comprises the rest of the system.

Fig. 2 is a section on the line 2—2 of Fig. 1.

Fig. 3 is a side elevation of a similar device used as a pressure gauge.

In the drawings the numeral 10 indicates a diaphragm preferably having a central conical portion 11 and a peripheral flexible portion 12. This diaphragm tightly seals the upper end of a cup shaped member 13 to form a chamber. This member 13 is here shown as constructed of metal, forming a convenient ground for the lower end of the wire 20. A tube 14 connects the interior of this chamber with a capsule 15. The chamber, the tube and the capsule form a hermetically sealed compartment which is, for most purposes, completely filled with a liquid 16, such as oil.

When the compartment is completely filled, the maximum responsiveness to temperature changes is obtained because slight changes in volume due to expansion create correspondingly large pressure changes. If, however, there be left in the compartment a bubble of gas, its compressibility will serve as a cushion and greater changes in temperature will be required to create the same change in tension in the wire.

A double limit stop is preferably provided. This is conventionally shown as a bracket 17 attached to the diaphragm having a peripheral groove 18 cooperating with Z-shape brackets 19 on the cup, so that the diaphragm will not be unduly distorted.

Attached to the central portion 11 of the diaphragm 10 is a measuring vibrator wire 20 which is held taut, and parallel to it is a linear electrode 21. These wires are shown supported as follows: A cylindrical shell 25 extends upwardly from the periphery of the cup 13. This shell will, as will be understood, be of a material which will not shield the wire and the electrode from magnetic flux from the magnet hereinafter described. Within this shell is an insulating member which, for purposes of construction, is conveniently divided into sectors, as for example 26, 27, 28 and 29. These sectors 27, 28 and 29 are cut away to provide a central axial bore 30, in which the wire 20 is stretched. The other sector 26 has an inwardly projecting edge 31, into which the electrode 21 is imbedded, except that its surface is preferably exposed on the side toward the wire 20. The electrode 21 has a connection 32 to the outside which is insulated from the shell 25.

The upper ends of the combined insulator comprising the insulating members 26, 27, 28 and 29 carry at the center a plate 33, to which the upper end of the wire 20 may be clamped as by screws 34. This plate is held in central position, insulated from the shell 25 by any suitable construction, for example by an insulating disc 35 fitted to receive the plate and to close the upper end of the shell. The electric terminals of the wire 20 are the frame of the device as at 36 and the plate 33.

Means are provided for establishing a magnetic field of force transverse to the plane defined by the electrode 21 and wire 20. This is shown in the drawing as the magnet poles, designated by the characters N and S.

The numeral 40 represents a radio tube, the plate 41 of which is connected through a transformer 42 with a battery 43 and thence to ground at G. This plate is also connected through a condenser 44 and a wire 37 with plate 33 and thereby to the upper end of the wire 20, preferably through a feed back control resistor 44a.

The grid 45 of the tube 40 is connected to ground by a grid leak 46 and a sufficient grid bias battery 46a to maintain the proper bias on the grid, and to the electrode 21 through a condenser 47. A battery 48 acting through a resistance 49 imposes potential on the electrode.

With the foregoing construction, it will be clear that any variation in the temperature of the capsule 15 will cause a change in volume of the liquid 16 and this reacting on the diaphragm 10 will vary the tension on the wire 20 and so vary its period of vibration, in exact accordance with the expansion of the liquid.

The oscillating system takes its frequency from the vibrating wire and responds to the variations in electric charge upon the electrode caused by its change in electrostatic capacity as the wire vibrates to and from it. Thus, because of the manner of imparting impulses to the wire and the manner of taking off control from the wire, the oscillating current is extremely responsive to the tension on the wire, free from extraneous factors which might broaden its response or alter the frequency.

Temperature variations of all kinds in the instrument itself, other than those imposed upon the capsule, may be compensated within the instrument itself by a choice of dimensions and materials. For example, if the insulators 26, 27, 28 and 29 be of quartz, the wire 20 of tungsten and the shell 25 of iron, the combined thermal expansion of the shell between the diaphragm and the point of attachment between the shell and the insulators, plus the expansion of the insulators above the point of attachment, may be made such as to neutralize the thermal expansion of the wire whose coefficient is between quartz and iron.

In Fig. 3 the same instrument is shown as a pressure gauge. Here the tube 14a is connected to the source of pressure to be measured, such as a steam boiler 60, so that the diaphragm will respond to the pressure to which it is subjected.

In either case, the pressure values produce exactly corresponding values in the frequency of the oscillating current.

At any point where it is desired, or at a plurality of points, if desired, the pulsating current may be measured as to frequency and the result, by a proper choice of constants, may be read or recorded directly as temperature or pressure. These values may be transmitted to a distance either by wire or by radiation and amplified at the receiving station without introducing errors in the readings.

The transducer shown in the companion application 520,196 is suitable for use in the circuit, and I contemplate the use of such an instrument in the circuit to reduce the frequency values to pressure or temperature values, and with such an instrument the pressures or temperatures may be read direct. Moreover, if desired, the frequency can be connected to perform any operating or regulating function desired, as for example by regulating the frequency of any local apparatus by means of the pressure or temperature on the gauge. These various uses are here schematically shown generically as a frequency meter.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In a telegauge, in combination, a chamber having a diaphragm subjected to pressure variations, a magnet, a wire attached to said diaphragm and stretched transverse to the field of said magnet and symmetrically disposed with regard to the field thereof, an oscillator, an electrode parallel to said wire and in the plane of vibration thereof of substantially the same length as the vibrating portion of the wire, connected to said oscillator to determine the frequency thereof by the changes in capacity between said electrode and said wire and means for imposing a potential between said electrode and said wire, and means for feeding current through said wire from said oscillator.

2. In a telegauge, in combination, a chamber having a diaphragm, a capsule spaced from but connected to said chamber and forming therewith a closed container filled with liquid, a magnet, a wire attached to said diaphragm and stretched in the field of said magnet and symmetrically disposed with regard to the field thereof, an oscillator, an electrode parallel to said wire and in the plane of vibration thereof of substantially the same length as the vibrating portion of the wire, connected to said oscillator to determine the frequency thereof by the changes in capacity between said electrode and said wire and means for imposing a potential between said electrode and said wire, and means for feeding current through said wire from said oscillator.

3. A device of the character described, comprising a generally cylindrical vessel having a closed end, a diaphragm dividing said vessel and forming with said end a pressure chamber, an insulator in the other end of said shell, a wire stretched between the said diaphragm and said insulator, an electrode carried by said insulator parallel to said wire and of substantially the same length as the vibrating portion of the wire, and electrical connections to the said electrode and to each end of said wire.

4. In a device of the character described, in combination, a closed chamber having a diaphragm wall, means for transmitting pressure to said diaphragm wall, a wire stretched between said wall and a support, an elongated electrode parallel to said wire and of substantially the same length as the vibrating portion of the wire, a magnet establishing magnetic lines of force transverse to the common plane of said wire and electrode having poles centrally placed opposite the vibrating portion of the wire and extending for a distance greater than one-third the length of the wire, an oscillating system having its frequency controlled by the capacity between said electrode and said wire, and furnishing an alternating current to said wire said oscillator including an electric circuit containing said electrode and wire as a capacity and means responsive to changes in said electric circuit due to changes in capacity, to control said oscillatory system.

5. A device of the character described comprising, in combination, a pressure chamber having a flexible wall, a frame connected to said pressure chamber, and a wire stretched between said frame and said movable wall in position to vary its tension with variations in the pressure within said chamber, an electrode of substantially the same length as the vibrating portion of said wire, and means for supporting said electrode adjacent to and parallel to said wire, and symmetrically placed with regard thereto.

6. A device of the character described comprising, in combination, a pressure chamber having a flexible wall, a frame connected to said pressure chamber, and a wire stretched between said frame and said movable wall in position to vary its tension with variations in the pressure within said chamber, an electrode of substantially the same length as the vibrating portion of said wire, means for supporting said electrode adjacent to and parallel to said wire, and symmetrically placed with regard thereto, and means for establishing a magnetic field transverse to the plane of said wire and said electrode.

7. A pressure chamber having a casing, a movable wall situated in one end of said casing, an insulator within said casing, a wire stretched between said movable wall and said other end of said casing, and an electrode carried by said insulator parallel to said wire of substantially the same length as the vibrating portion of said wire, and symmetrically spaced with regard thereto.

8. A device of the character described adapted for use with an oscillatory circuit connected to measure tension on a wire by the frequency of vibration thereof, comprising in combination, a casing having a flexible partition forming a closed compartment at one end thereof adapted to be filled with a liquid, a wire stretched between the center of said partition and the other end of said casing, and being insulated from said casing at one end, electrical connections between the ends of the wire and the exterior of said casing whereby the wire may be connected to an oscillatory circuit.

9. A device of the character described adapted for use with an oscillatory circuit connected to measure tension on a wire by the frequency of vibration thereof, comprising in combination, a casing having a flexible partition forming a closed compartment at one end thereof adapted to be filled with a liquid, a wire stretched between the center of said partition and the other end of said casing and being insulated from said casing at one end, electrical connections between the ends of the wire and the exterior of said casing whereby the wire may be connected to an oscillatory circuit, and frequency take-off mechanism within said casing.

10. A device of the character described adapted for use with an oscillatory circuit connected to measure tension on a wire by the frequency of vibration thereof, comprising in combination, a casing having a flexible partition forming a closed compartment at one end thereof adapted to be filled with a liquid, a wire stretched between the center of said partition and the other end of said casing and being insulated from said casing at one end, electrical connections between the ends of the wire and the exterior of said casing whereby the wire may be connected to an oscillatory circuit, and means for maintaining a magnetic field transverse to said wire.

FRANK RIEBER.

REFERENCES CITED

The following references are of record in the file of this patent:

UNITED STATES PATENTS

| Number | Name | Date |
| --- | --- | --- |
| 1,507,965 | Ibbott | Sept. 9, 1924 |
| 1,638,993 | Hartley | Aug. 16, 1927 |
| 1,722,619 | Ziegler | July 30, 1929 |
| 1,870,058 | Levine | Aug. 2, 1932 |
| 1,878,109 | Clark | Sept. 20, 1932 |
| 1,995,305 | Hayes | Mar. 26, 1935 |
| 2,027,074 | Miessner | Jan 7, 1936 |
| 2,050,674 | Stover | Aug. 11, 1936 |
| 2,138,041 | Roudaney | Dec. 6, 1938 |
| 2,220,350 | Purington | Nov. 5, 1940 |
| 2,236,985 | Bartelink | Apr. 1, 1941 |
| 2,265,011 | Siegal | Dec. 2, 1941 |
| 2,266,114 | Bartlett | Dec. 16, 1941 |
| 2,302,895 | Root | Nov. 24, 1942 |
| 2,318,936 | Fisher | May 11, 1943 |
| 2,377,869 | Elliott | June 12, 1945 |